US011186430B2

(12) United States Patent
Williams et al.

(10) Patent No.: US 11,186,430 B2
(45) Date of Patent: Nov. 30, 2021

(54) CARGO CONTAINER

(71) Applicant: The Boeing Company, Chicago, IL (US)

(72) Inventors: Michael J. Williams, St. Charles, MO (US); Raymond Watkins, Black Diamond, WA (US)

(73) Assignee: The Boeing Company, Chicago, IL (US)

( * ) Notice: Subject to any disclaimer, the term of this patent is extended or adjusted under 35 U.S.C. 154(b) by 268 days.

(21) Appl. No.: 15/982,212

(22) Filed: May 17, 2018

(65) Prior Publication Data
US 2019/0352087 A1 Nov. 21, 2019

(51) Int. Cl.
*B65D 88/14* (2006.01)
*B64D 11/06* (2006.01)

(52) U.S. Cl.
CPC .......... *B65D 88/14* (2013.01); *B64D 11/0627* (2014.12)

(58) Field of Classification Search
CPC ... B64D 11/0627; A47B 81/002; B60R 7/043; B65D 88/14
USPC ............... 220/23.2, 503, 505, 23.4
See application file for complete search history.

(56) References Cited

U.S. PATENT DOCUMENTS

| | | | |
|---|---|---|---|
| 3,345,118 A * | 10/1967 | Cummings | B60N 3/002 312/235.8 |
| 3,909,092 A * | 9/1975 | Kiernan | B60R 7/043 312/235.8 |
| D329,944 S * | 10/1992 | Longtin | D12/423 |
| 5,209,386 A * | 5/1993 | Allison | B60R 7/043 220/529 |
| 5,277,148 A | 1/1994 | Rossignol et al. | |
| 5,421,476 A | 6/1995 | Matias | |
| 5,657,896 A | 8/1997 | Matias | |
| 5,718,191 A | 2/1998 | O'Donnell | |
| 6,015,198 A * | 1/2000 | Stair | B60N 3/002 108/44 |
| 6,079,370 A | 6/2000 | Al-Birmani et al. | |
| 6,571,740 B1 | 6/2003 | Kinder et al. | |
| 6,588,365 B2 | 7/2003 | Wright | |
| 7,617,797 B2 | 11/2009 | Lam | |
| 8,056,511 B1 | 11/2011 | Espinoza et al. | |
| 8,631,766 B2 | 1/2014 | Frasier et al. | |
| 9,150,163 B2 | 10/2015 | Cronkright, II | |
| 9,849,838 B1 | 12/2017 | Sicilian | |

(Continued)

OTHER PUBLICATIONS

U.S. Appl. No. 15/627,505, filed Jun. 20, 2017.

*Primary Examiner* — Jeffrey R Allen
(74) *Attorney, Agent, or Firm* — Kunzler Bean & Adamson

(57) ABSTRACT

A cargo container for resting on a seat of a vehicle. An upper portion of the cargo container defines a first internal storage space and comprises a first bottom panel to rest on the seat of the vehicle. The upper portion has a first depth corresponding with a depth of the seat. The upper portion comprises a hinged door openable to provide access to the first internal storage space and closable to restrict access to the first internal storage space. A leg portion extends from the upper portion. The leg portion has a second depth less than the first depth. The leg portion is sized to engage a floor of the vehicle when the first bottom panel is resting on the seat of the vehicle. A seatbelt engagement feature is coupled to the upper portion and is configured to engage a seatbelt for the seat of the vehicle.

20 Claims, 10 Drawing Sheets

(56) References Cited

U.S. PATENT DOCUMENTS

| | | |
|---|---|---|
| 10,486,641 B2 | 11/2019 | Koop |
| 2003/0127060 A1 | 7/2003 | Yeung |
| 2005/0279750 A1* | 12/2005 | Barquist .............. F16M 13/005 220/629 |
| 2006/0213452 A1 | 9/2006 | King |
| 2006/0278173 A1 | 12/2006 | Kamijo |
| 2007/0228097 A1* | 10/2007 | Recanati ................ B60R 7/043 224/580 |
| 2008/0011234 A1 | 1/2008 | Wilkes |
| 2008/0245311 A1 | 10/2008 | Kline |
| 2009/0078713 A1 | 3/2009 | Quick et al. |
| 2009/0199770 A1 | 8/2009 | Jakubowski et al. |
| 2009/0314219 A1 | 12/2009 | Bryson |
| 2010/0139573 A1 | 6/2010 | Wilson et al. |

* cited by examiner ns and more CARGO CONTAINER

FIELD

This disclosure relates generally to containers, and more particularly to cargo containers.

BACKGROUND

Many vehicles provide the ability and opportunity to transport passengers and cargo from one location to another. These vehicles include both passenger and cargo spaces. Passenger space is generally equipped with seats, beds, or other accommodations to facilitate comfortable and efficient organization and security for passengers of the vehicle. Cargo space is generally dedicated to maximizing space with fewer concerns for the comfort of typical cargo carried by the vehicle.

SUMMARY

The subject matter of the present application has been developed in response to the present state of the art, and, in response to the problems and disadvantages associated with conventional methods for storing cargo on a seat of a vehicle. Accordingly, the subject matter of the present application has been developed to improve cargo storage that overcomes at least some of the above-discussed shortcomings of prior art techniques.

Described herein is a cargo container for resting on a seat of a vehicle. The cargo container comprises an upper portion defining a first internal storage space and comprising a first bottom panel configured to rest on the seat of the vehicle, wherein the upper portion has a first depth corresponding with a depth of the seat and further comprises at least one door openable to provide access to the first internal storage space and closable to restrict access to the first internal storage space. The cargo container also comprises a leg portion extending from the upper portion, wherein the leg portion has a second depth less than the first depth of the upper portion and the leg portion is sized to engage a floor of the vehicle when the first bottom panel is resting on the seat of the vehicle. The cargo container further comprises a seatbelt engagement feature coupled to the upper portion and configured to engage a seatbelt for the seat of the vehicle. The preceding subject matter of this paragraph characterizes example 1 of the present disclosure.

The at least one door forms at least part of at least one of the front panel, a first side panel, and a second side panel of the upper portion, wherein the first side panel and the second side panel are opposite one another. The preceding subject matter of this paragraph characterizes example 2 of the present disclosure, wherein example 2 also includes the subject matter according to example 1, above.

The leg portion comprises a front panel and the at least one door forms at least part of the front panel of the leg portion. The preceding subject matter of this paragraph characterizes example 3 of the present disclosure, wherein example 3 also includes the subject matter according to any one of examples 1-2, above.

The leg portion comprises at least one rolling element that is at least partially retractable into the leg portion. The preceding subject matter of this paragraph characterizes example 4 of the present disclosure, wherein example 4 also includes the subject matter according to any one of examples 1-3, above.

The at least one rolling element allows for movement of the cargo container in a plurality of directions. The preceding subject matter of this paragraph characterizes example 5 of the present disclosure, wherein example 5 also includes the subject matter according to example 4, above.

The first bottom panel is disposed at an obtuse angle relative to a first back panel. The preceding subject matter of this paragraph characterizes example 6 of the present disclosure, wherein example 6 also includes the subject matter according to any one of examples 1-5, above.

The leg portion defines a second internal storage space. The preceding subject matter of this paragraph characterizes example 7 of the present disclosure, wherein example 7 also includes the subject matter according to any one of examples 1-6, above.

The at least one door further comprises a side door disposed on at least one of a first side panel and a second side panel of the cargo container to access at least one of the first internal storage space and the second internal storage space. The preceding subject matter of this paragraph characterizes example 8 of the present disclosure, wherein example 8 also includes the subject matter according to example 7, above.

The seatbelt engagement feature forms a passthrough to allow the seatbelt to pass, and be secured, through the cargo container to restrain the cargo container relative to the seat. The preceding subject matter of this paragraph characterizes example 9 of the present disclosure, wherein example 9 also includes the subject matter according to any one of examples 1-8, above.

The seatbelt engagement feature comprises at least one coupling to engage with the seatbelt to secure the cargo container relative to the seat. The preceding subject matter of this paragraph characterizes example 10 of the present disclosure, wherein example 10 also includes the subject matter according to any one of examples 1-9, above.

The cargo container further comprises at least one organizational structure disposed within the cargo container to facilitate organization of cargo within the cargo container. The preceding subject matter of this paragraph characterizes example 11 of the present disclosure, wherein example 11 also includes the subject matter according to any one of examples 1-10, above.

The organizational structure at least one of subdivides the first internal storage space, isolates the first internal storage space from a second internal storage space defined by the leg portion, and subdivides the second internal storage space. The preceding subject matter of this paragraph characterizes example 12 of the present disclosure, wherein example 12 also includes the subject matter according to example 11, above.

The cargo container further comprises a port disposed in at least one of the upper portion and the leg portion. The preceding subject matter of this paragraph characterizes example 13 of the present disclosure, wherein example 13 also includes the subject matter according to any one of examples 1-12, above.

Further described herein is a cargo container for resting on a seat of a vehicle, the vehicle comprising at least two seats in tandem, such that a space is defined between the at least two seats, and a floor on which the two seats are supported, wherein each seat comprises a seat back, a seating surface, and a seat belt. The cargo container comprises an upper portion defining a first internal storage space and comprising a first bottom panel configured to rest on the seat of the vehicle, wherein the upper portion has a first depth corresponding with a depth of the seat. The cargo container also comprises a leg portion extending from the upper portion, wherein the leg portion has a second depth less than the first depth of the upper portion and the leg portion is sized to engage a floor of the vehicle when the first bottom panel is resting on the seat of the vehicle, the leg portion further comprising a rolling element at a second bottom panel. The cargo container further comprises a seatbelt engagement feature coupled to the upper portion and configured to engage the seatbelt of the seat of the vehicle. The preceding subject matter of this paragraph characterizes example 14 of the present disclosure.

The cargo system further comprises a hinged door forming at least a portion of a front panel of at least one of the upper portion and the leg portion, wherein the at least one hinged door is openable to provide access to the first internal storage space and closable to restrict access to the first internal storage space. The preceding subject matter of this paragraph characterizes example 15 of the present disclosure, wherein example 15 also includes the subject matter according to example 14, above.

Further described herein is a method of providing cargo storage in a passenger space of a vehicle. The method of providing cargo storage in a passenger space of a vehicle comprises translating, in a first direction, a cargo container along a passenger aisle. The method of providing cargo storage in a passenger space of a vehicle also comprises positioning the cargo container at a row corresponding to a seat. The method of providing cargo storage in a passenger space of a vehicle further comprises aligning the cargo container with the row such that a first bottom panel of an upper portion of the cargo container passes over a seating surface of the row and a leg portion of the cargo container passes in front of the row. The method of providing cargo storage in a passenger space of a vehicle additionally comprises translating, in a second direction, the cargo container along the row to align with the seat. The method of providing cargo storage in a passenger space of a vehicle also comprises securing the cargo container on the seat with the first bottom panel resting on the seat and a leg portion of the cargo container engaged with a floor of the vehicle. The preceding subject matter of this paragraph characterizes example 16 of the present disclosure.

Translating the cargo container in the first direction and the second direction comprises translating the cargo container on at least one rolling element of the cargo container. The preceding subject matter of this paragraph characterizes example 17 of the present disclosure, wherein example 17 also includes the subject matter according to example 16, above.

Aligning the cargo container further comprises rotating the cargo container on the at least one rolling element. The preceding subject matter of this paragraph characterizes example 18 of the present disclosure, wherein example 18 also includes the subject matter according to example 17, above.

The method further comprises extending the at least one rolling element. The method also comprises retracting the at least one rolling element. The preceding subject matter of this paragraph characterizes example 19 of the present disclosure, wherein example 19 also includes the subject matter according to any one of examples 17-19, above.

Securing the cargo container relative to the seat comprises engaging a seatbelt of the seat with a seatbelt engagement feature of the cargo container. The preceding subject matter of this paragraph characterizes example 20 of the present disclosure, wherein example 20 also includes the subject matter according to any one of examples 16-20, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Described below are embodiments which relate to a cargo container. The cargo container provides an efficient use of available or unused passenger space to increase the cargo carrying capability of a vehicle. The cargo container is capable of securing cargo in a seat that is not occupied by a passenger. The use of the unoccupied space increases the efficiency of the voyage and provides additional options and flexibility to the carrier associated with the vehicle and to those sending or receiving cargo.

Embodiments of the cargo container are sized to accommodate and utilize the space typically reserved for a passenger on a seat. The cargo container may include a relatively larger upper portion positioned over a relatively smaller leg portion. The upper portion is configured to occupy the space on a seat above a seating surface of the seat. The leg portion is configured to occupy the space available in front of the seat and below the seating surface (space normally reserved for the calves and feet of an occupant).

The cargo container may be loaded with cargo via a door. The door may include a hinged door, a hatch, a lid, an aperture, and a removeable panel. The door secures contents of the cargo container during travel. This reduces the risk of injury to passengers. The cargo container itself may be secured to the seat via a seatbelt of the seat or via a separate securing structure corresponding to the cargo container.

The cargo container may be moved by rolling the cargo container on at least one rolling element coupled to the leg portion of the cargo container. The rolling elements may allow the cargo container to be rotated and translated in multiple directions. The cargo container may include handles, handholds, mounts, or other structures to facilitate moving, supporting, securing, or otherwise applying force to the cargo container. The shape of the cargo container with the upper portion and leg portion may allow the cargo container to move over one or more seats in a row until a seat available to accept the cargo container is reached.

Figure 1:
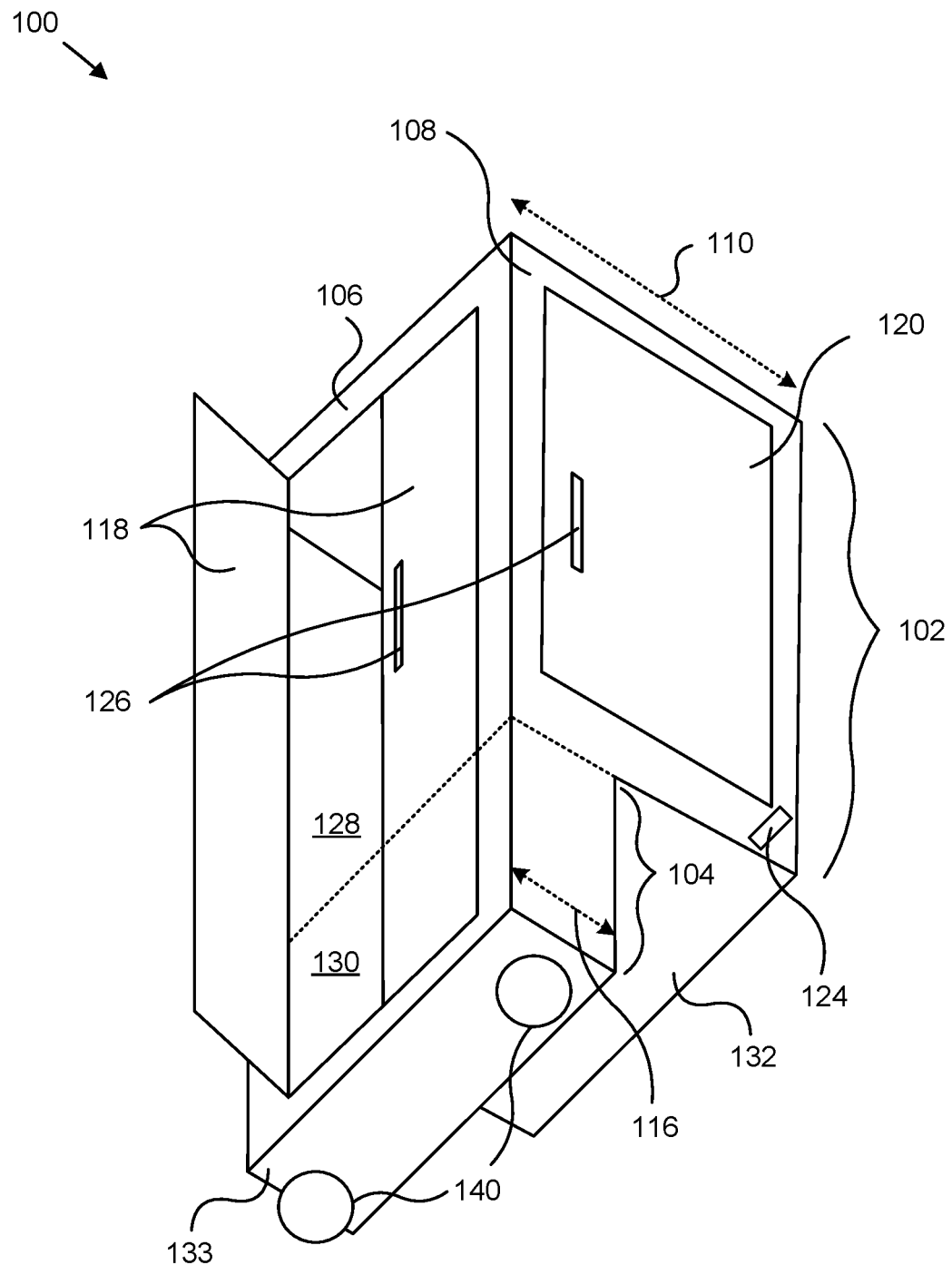
FIG. 1 is a lower perspective view of a front side of a cargo container, according to one or more examples of the present disclosure.
Figure 2:
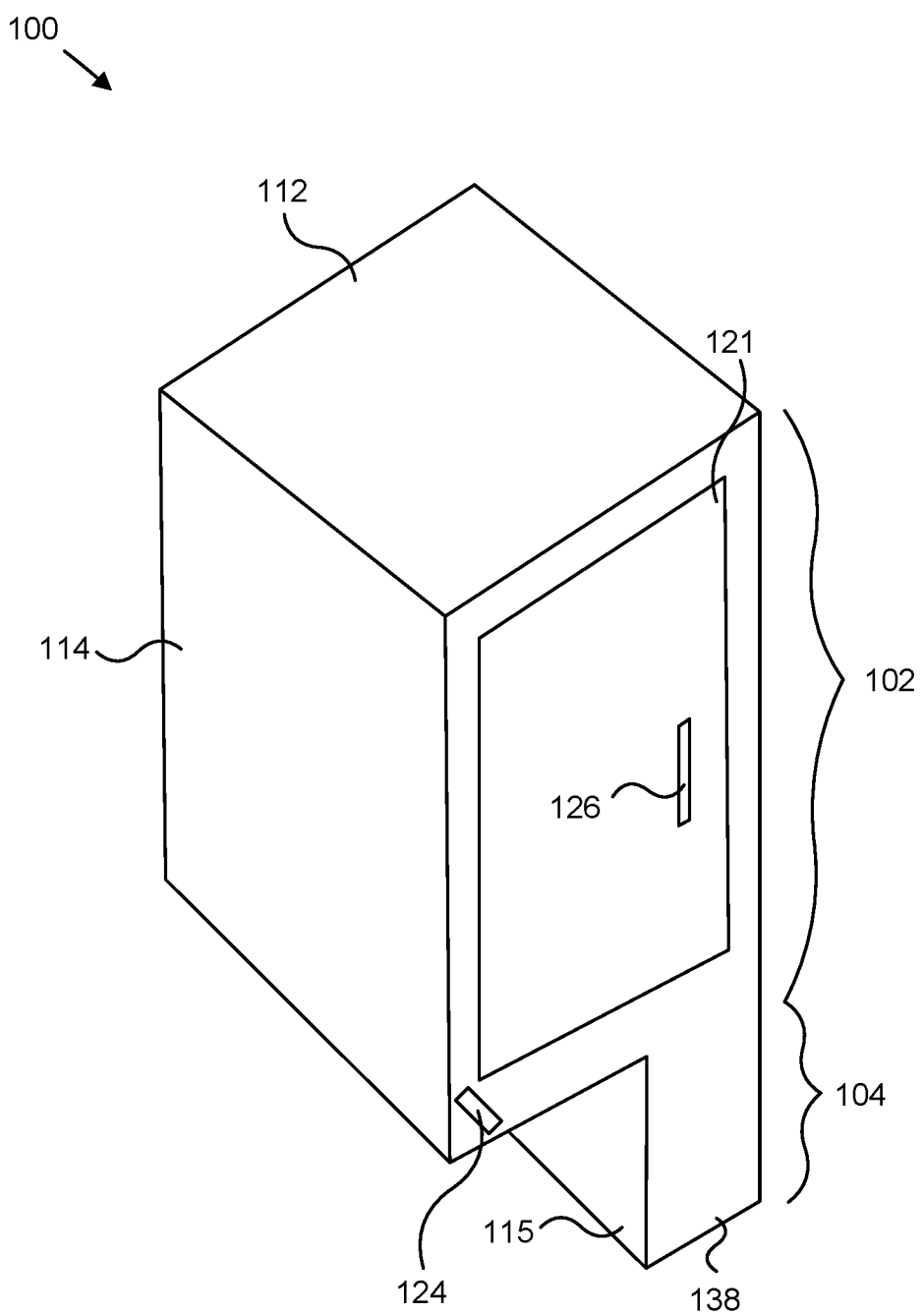
FIG. 2 is an upper perspective view of a back side of the cargo container of FIG. 1, according to one or more examples of the present disclosure.

Referring to FIG. 1 and FIG. 2, one embodiment of a cargo container 100 is shown. The cargo container 100 is configured to rest on a seat of a vehicle. The cargo container 100 includes an upper portion 102, a leg portion 104, and a seatbelt engagement feature 124.

The upper portion 102 includes a front panel 106, a first back panel 114, a first side panel 108, a second side panel 138, a top panel 112, and a first bottom panel 132. The first back panel 114 is opposite the front panel 106. The first back panel 114 and the front panel 106 may be parallel to one another. The first side panel 108 is opposite the second side panel 138. The first side panel 108 and the second side panel 138 may be parallel to one another. The top panel 112 is opposite the first bottom panel 132. In some embodiments, the first side panel 108 and the second side panel 138 are both perpendicular to each of the front panel 106, the first back panel 114, the top panel 112, and the first bottom panel 132. Additionally, the front panel 106 and the first back panel 114 can be perpendicular to the top panel 112 and the first bottom panel 132. The front panel 106, the first back panel 114, the first side panel 108, the second side panel 138, the top panel 112, and the first bottom panel 132 collectively form the upper portion 102 of the cargo container 100. The upper portion 102 also has a first depth 110 defined as the distance between the front panel 106 and the first back panel 114 in a direction substantially perpendicular to both the front panel 106 and the first back panel 114. The first depth 110 may correspond with a depth of a seat.

The upper portion 102 defines a first internal storage space 128. The first internal storage space 128 may be configured to receive cargo, such as letters, packages, pouches, or the like. Additionally, the first internal storage space 128 may be configured to accommodate a pet. In some embodiments, the first bottom panel 132 may extend to the front panel 106 such that the upper portion 102 is defined as a single unified structure that defines the first internal storage space 128. In some embodiments, the first internal storage space 128 may be at least partially defined by an organizational structure such as a shelf, locker, or the like disposed within the cargo container 100. For example, the cargo container 100 may include a removeable or permanent shelf or other structure within the cargo container 100 which at least partially defines the first internal storage space 128.

The upper portion 102 further includes a door openable to provide access to the first internal storage space 128 and closeable to restrict access to the first internal storage space 128. The door may be hingedly coupled to the upper portion 102 of the cargo container 100. In the illustrated embodiment, the upper portion 102 includes multiple doors. For example, the upper portion 102 includes a front door 118, coupled to the front panel 106 of the cargo container 100, a first side door 120, coupled to the first side panel 108, and a second side door 121, coupled to the second side panel 138. While the illustrated embodiment includes three doors (e.g., the front door 118, the first side door 120, and the second side door 121), in other embodiments, the upper portion 102 includes one, two, or more than three doors or other access features.

As one example, the front door 118 is formed in the front panel 106 and spans a part of both the upper portion 102 and the leg portion 104. Alternatively, the front door 118 may be formed in the front panel 106 but span only the upper portion 104. While the front door 118 is shown as a double door, the front door 118 may also be a single door or include more than two doors.

The first side door 120 is formed in the first side panel 108 and spans only the first side panel 108. The second side door 121 is formed in the second side panel 138 and spans only the second side panel 138. Alternatively, in some examples, one or both of the first side door 120 and the second side door 121 may also span at least a part of the leg portion 104.

At least one of the front door 118, the first side door 120, and the second side door 121 may be a hinged door, a rolling door, a drawer, a curtain, a removeable panel, a lid, a net, a hatch, or the like. One or more of the doors may be similar or distinct from one another. One or more of the doors may include a handle 126, which may include a locking mechanism to prevent tampering and to secure the contents of the cargo container 100. In some embodiments, a passenger may be allowed access to at least a portion of the cargo container 100 to store personal items via at least one of the doors.

Figure 5:
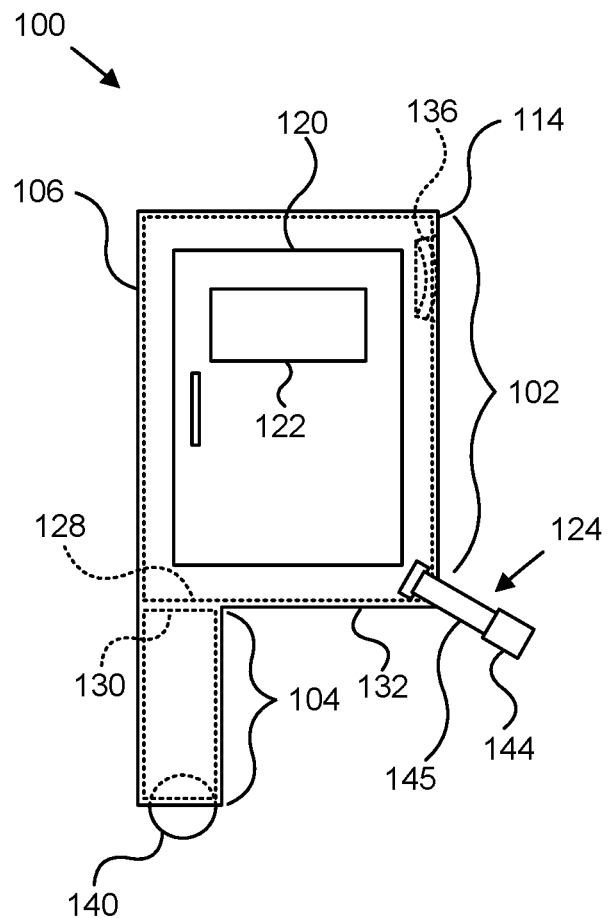
FIG. 5 is a side elevation view of the first side of a cargo container, according to one or more examples of the present disclosure.

Referring to FIG. 5, in the illustrated embodiment the first side door 120 includes a port 122. The port 122 may be a vent to allow air exchange with an interior of the cargo container 100, a window to allow visual access to an interior of the cargo container (for example to check on a pet, verify contents, allow light to enter the cargo container 100, a power connection to provide power to an active component of the cargo container 100 (for example, a sensor, a GPS tracker, a heater, a cooler, or the like), a label, warning, or other signage (such as a digital display or other indicator which may list the content, the shipper, the destination, handling instructions, or the like). In the illustrated embodiment, the port 122 is formed in, or coupled to, the first side door 120 to be nearer the top of the first side door 120. The port 122 may also be disposed elsewhere on the first side door 120. Although the port 122 is shown as forming part of the first side door 120, in other examples, the front door 118 and/or the second side door 121 may additionally or alternatively include a port 122. Additionally, or alternatively, a port 122 can be formed in the top panel 112 (see, e.g., FIG. 3) or other non-door portions of the cargo container.

Referring again to FIGS. 1 and 2, the leg portion 104 of the cargo container 100 is coupled to and extends from the upper portion 102. The upper portion 102 and the leg portion 104 of the cargo container 100 may be a single unified structure. For example, the upper portion 102 and the leg portion 104 may be formed or manufactured as a single piece or assembly using the same material or combination of materials. In other embodiments, the upper portion 102 and the leg portion 104 may be formed separately from one another, with the same or distinct materials and construction, and joined together to form the cargo container 100. The upper portion 102 and the leg portion 104 can be made from various materials, such as, natural materials and synthetic materials. For example, one or both of the upper portion 102 and the leg portion 104 may be made of a metal, plastic, composite, or the like.

The leg portion 104 includes part of the front panel 106, a second back panel 115, part of the first side panel 108, part of the second side panel 138, and a second bottom panel 133. As presented above, the first side panel 108 is opposite the second side panel 138. Additionally, the second back panel 115 is opposite the front panel 106. The second back panel 115 may be parallel to the front panel 106 and the first back panel 114 and perpendicular to the first bottom panel 132, the second bottom panel 133, the top panel 112, the first side panel 108, and the second side panel 138. The second bottom panel 133 is opposite the top panel 112. The second bottom panel 133 may be parallel to at least one of the top panel 112 and the first bottom panel 132. The second bottom panel 133 may also be perpendicular to the front panel 106, the first back panel 114, the second back panel 115, the first side panel 108, and the second side panel 138. The front panel 106, the second back panel 115, the first side panel 108, the second side panel 138, and the second bottom panel 133 collectively form the leg portion 104 of the cargo container 100.

The leg portion 104 has a second depth 116 that is less than the first depth 110 of the upper portion 102. The second depth 116 is defined as the distance between the front panel 106 and the second back panel 115 in a direction substantially perpendicular to both the front panel 106 and the second back panel 115.

Figure 3:
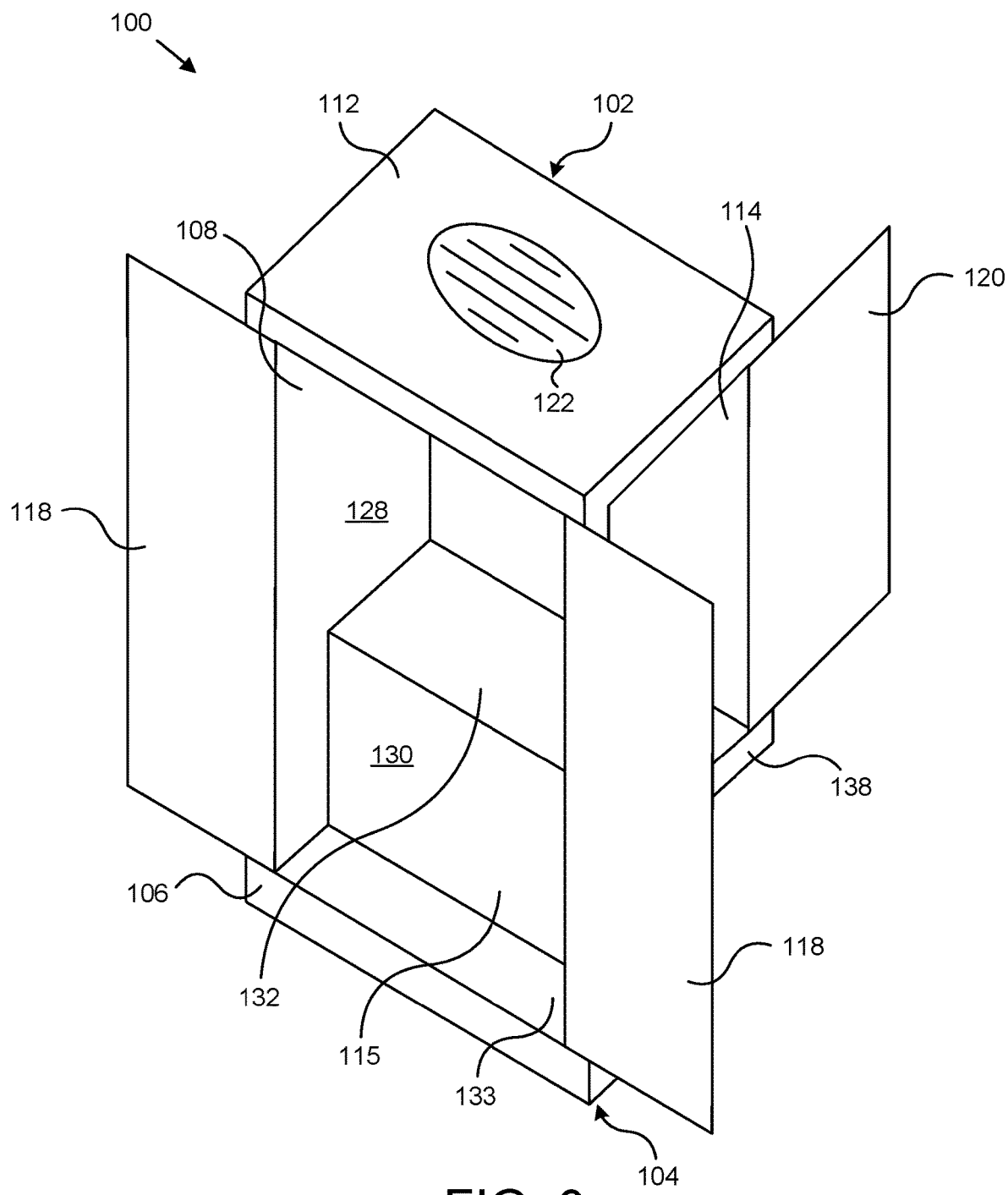
FIG. 3 is an upper perspective view of the front side of a cargo container, shown with the doors open, according to one or more examples of the present disclosure.

As shown in FIGS. 1 and 3, the leg portion 104 defines a second internal storage space 130. The second internal storage space 130 may be open to the first internal storage space 128 or may be at least partially separate from the first internal storage space 128. The second internal storage space 130 may be formed to accommodate a specific type of cargo such as letters, packages, pouches, or the like. In other embodiments, the second internal storage space 130 is at least partially occupied by components of the cargo container 100. For example, the second internal storage space 130 may include structures which facilitate retraction of rolling elements 140 into the leg portion 104 of the cargo container 100, as will be described in more detail below.

In the illustrated embodiment, the first internal storage space 128 is defined by the upper portion 102 and the second internal storage space 130 is defined by the leg portion 104. While the first internal storage space 128 and the second internal storage space 130 are identified separately, they may form a continuous internal space within the cargo container 100. The first internal storage space 128 and the second internal storage space 130 may also be at least partially separated from one another as described below.

Figure 4:
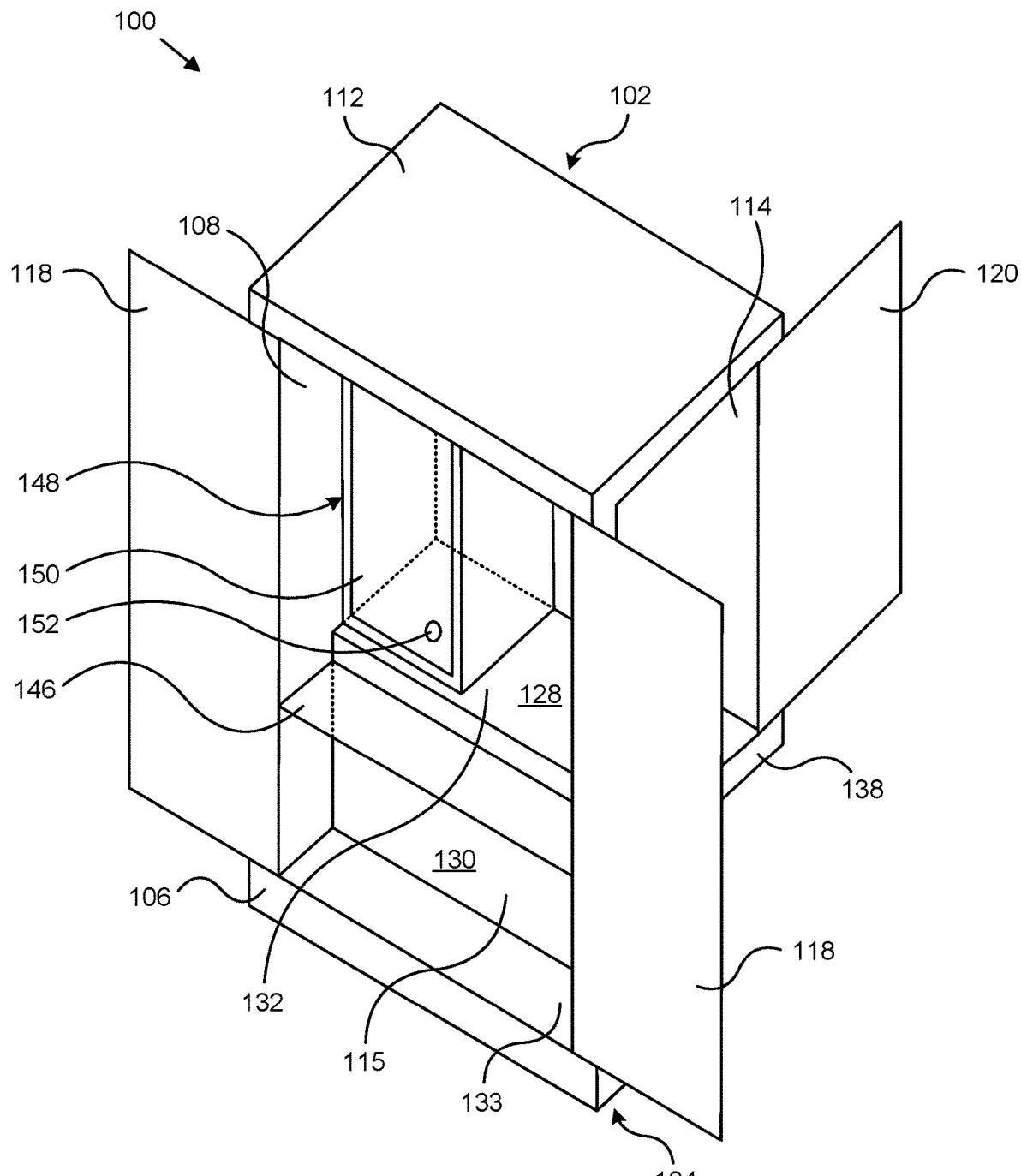
FIG. 4 is an upper perspective view of the front side of the cargo container of FIG. 1, shown with organizational structures positioned within the cargo container, according to one or more examples of the present disclosure.

Referring again to FIG. 4, the first internal storage space 128 and the second internal storage space 130 may include organizational structures, such as a shelf 146 and a locker 148. The shelf 146 divides the first internal storage space 128 from the second internal storage space 130. The shelf 146 is retractable in some examples. For example, the illustrated shelf 146 may be positionable to extend from the first bottom panel 132 to the doors 118. In another example, the shelf 146 may be adjustably positioned within either the first internal storage space 128 or the second internal storage space 128. In yet other examples, a plurality of shelves 146 may be used at multiple adjustable locations within the cargo container 100.

The locker 148 subdivides the first internal storage space 128 into separate spaces. In the illustrated embodiment, the locker 148 is disposed within the first internal storage space 128. The locker 148 may be coupled to at least one of the first side panel 108, the first back panel 114, and the first bottom panel 132. The locker 148 may include a door 150 having a locking feature 152 to facilitate locking cargo within the locker 148. The locker 148 may be removeable or permanently affixed within the cargo container 100. While the locker 148 is shown as being positioned within the first internal storage space 128, the locker 148 may also be disposed within the second internal storage space 130 corresponding to the leg portion 104.

At least one of the shelf 146 and locker 148 may be configurable to accommodate a specific cargo load or shape of a cargo item to be stored in the cargo container 100. In some embodiments, at least one of the shelf 146 and the locker 148, or other organizational structure, may allow the internal space of the cargo container 100 to be separated based on destination, cargo type, owner, or the like. While the embodiments described above specifically reference a shelf 146 and a locker 148, other organizational structures such as straps, nets, walls, bins, boxes, cases, hooks, latches, dividers, and the like may be included.

In the illustrated embodiment, the upper portion 102 and the leg portion 104 are shaped to have right angles. However, the upper portion 102 and the leg portion 104 may include rounded edges or corners, angles that may be more or less than 90°, and panels or other surfaces that are curved or non-linear. In some embodiments, it may be preferable to include some rounded or padded surfaces to increase passenger comfort or reduce risk of injury.

Referring again to FIG. 1, the leg portion 104 includes rolling elements 140. The rolling elements 140 may be retractable into, and extendable out of, the leg portion 104. The rolling elements 140 may pass through the second bottom panel 133, through the first side panel 108 and the second side panel 138, and/or the second back panel 115.

The rolling elements 140 are disposed in the leg portion 104 to facilitate moving the cargo container 100 along a floor, aisle, row, or the like. Each rolling element 140 may be a caster or other type of wheel, a roller ball, or the like. In some embodiments, each rolling element 140 is retractable into the leg portion 104 to limit the mobility of the cargo container. For example, the rolling elements 140 may be retracted when the cargo container 100 is stored or when the cargo container is secured in a seat. The rolling elements 140 may be extended to aid in moving the cargo container 100 when empty or when loaded. The rolling element 140 may allow for movement of the cargo container 100 in a plurality of directions. For example, each rolling element 140 may be a caster capable of rotating in 360°, a roller ball capable of rotating in a full range, or the like. Retracting and extending the rolling elements 140 may be controlled by a user through an interface internal to the cargo container 100 or through an external interface such as handles 136, the seatbelt engagement feature 124, or the like. The interface may be a standalone interface or may be incorporated into another feature of the cargo container 100. In some embodiments, the user may press a button, unlock a clip, slide a switch, or the like to lock or free the rolling elements 140 to retract or extend. While the illustrated embodiments shown herein include a pair of rolling elements 140, fewer or more rolling elements 140 may be included.

Referring to FIG. 5, the seatbelt engagement feature 124 of the cargo container 100 is formed in the upper portion 102 of the cargo container 100. The seatbelt engagement feature 124 is configured to engage a seatbelt to secure the cargo container 100 on a seat. The seatbelt engagement feature 124 may be formed in the upper portion 102 proximal the first bottom panel 132 and the first back panel 114. The seatbelt engagement feature 124 may include a passthrough opening or other opening in the cargo container 100, which allows a seatbelt to pass through the cargo container 100 and secure the cargo container 100. The seatbelt engagement feature 124 is shown as an elongated slot, formed in the upper portion 102, but may have other geometries and may have other placements on the cargo container 100.

The seatbelt engagement feature 124 may also allow at least one coupling 144 to be coupled to the cargo container 100 and pass through the seatbelt engagement feature 124 to engage with a seatbelt for securing the cargo container 100 to a seat. In the illustrated embodiment of FIG. 5, the seatbelt engagement feature 124 includes a strap 145, secured to the cargo container 100, such as extending through an elongated slot in the cargo container 100. The strap 145 may be made of similar material to that of the seatbelt or may be made of different material. In some implementations, the strap 145 is a flat, elongated structure. The strap 145 may be a nylon, polyester, Kevlar, cotton, or other synthetic, or natural material in a woven or unwoven arrangement. The coupling 144 is secured to the strap 145. The coupling 144 can be one of a buckle or tongue configured to releasably engage a tongue or buckle, respectively, of the seat belt of the seat. In other embodiments, the seatbelt engagement feature 124 includes a loop, ring, clip, hook, or other structure compatible with a seatbelt.

Also shown in FIG. 5, the cargo container 100 additionally includes a handle 136 in some examples. The handle 136 is coupled to the upper portion 102 of the cargo container 100 and may facilitate transport of the cargo container 100 to and from the seat 202. As shown, the handle 136 may be recessed in the cargo container 100 or coupled to a side panel 108 and 138 of the cargo container 100. The handle 136 may be retractable or fixed. In some embodiments, the handle 136 is a hand hold formed in the upper portion 102 of the cargo container 100. The handle 136 may also provide additional coupling points for securing or storing the cargo container 100. The handle 136 may also facilitate coupling of a lift, cart, truck, or dolly to the cargo container 100 to aid in moving the cargo container 100. Although one handle 136 is shown, multiple handles 136 may be incorporated into the cargo container 100.

Figure 6:
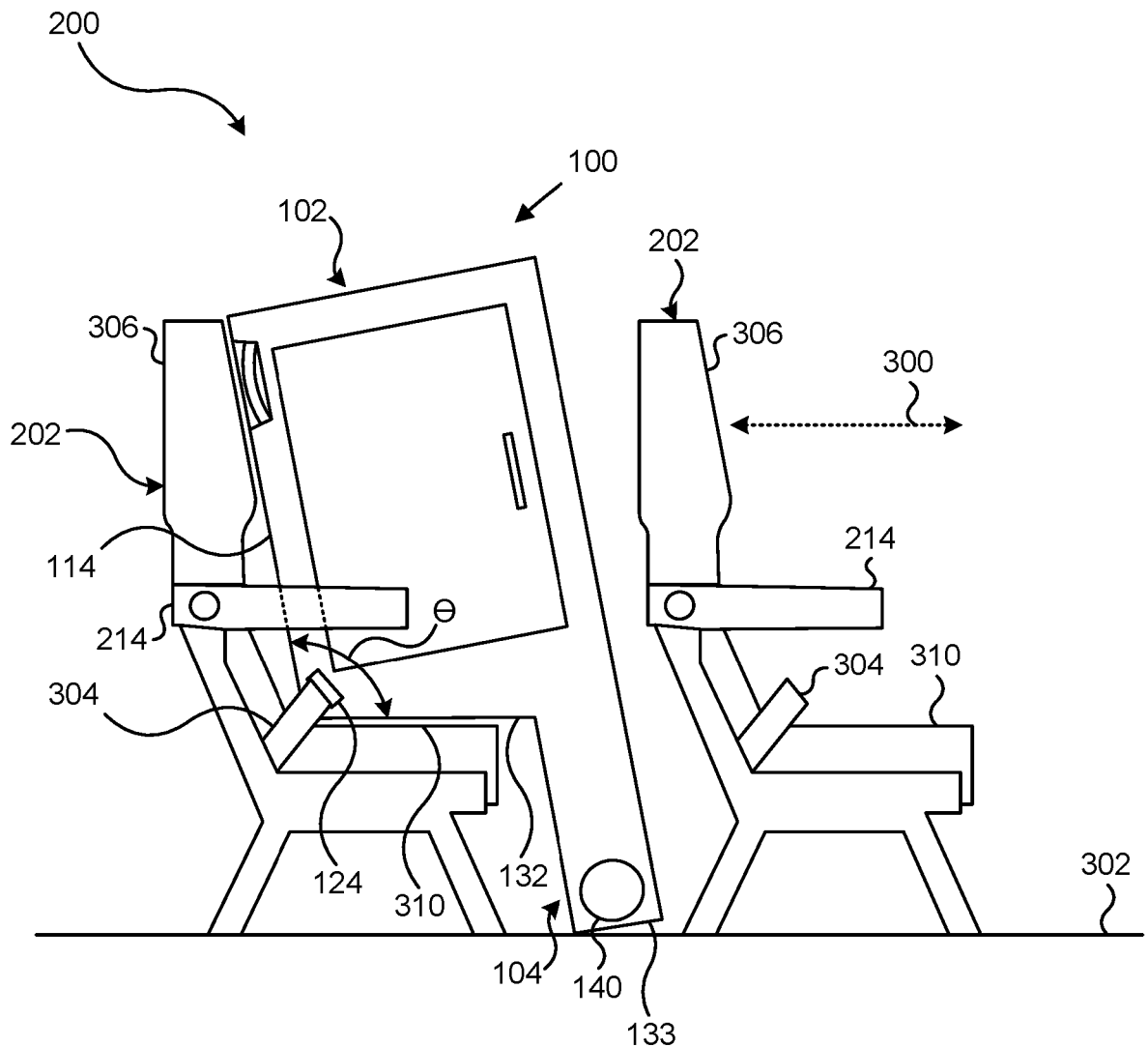
FIG. 6 is a side elevation view of a vehicle, according to one or more examples of the present disclosure.

Referring to FIG. 6, the leg portion 104 of the cargo container 100 is sized to engage a floor 302 of a vehicle 200 when the first bottom panel 132 of the upper portion 102 is resting on a seating surface 310 (e.g., seat pad) of a seat 202 of a vehicle 200. In other words, the leg portion 104 of the cargo container 100 has a length sufficient to reach the floor 302 of the vehicle 200 when the cargo container 100 is positioned on the seat 202. The seat 202 additionally includes a seatback 306 coupled to the seating surface 310. The seat 202 has a seat depth 300 defined by the seating surface 310 and the seatback 306. The seat 202 is coupled to a floor 302 of the vehicle 200. The seat 202 also includes a seatbelt 304 and an armrest 214. The seatbelt 304 may be a passenger seatbelt configured to secure a passenger in the seat 202. The armrest 214 may be fixed or pivotable.

In the illustrated embodiment, the cargo container 100 is secured to the seat 202 via the seatbelt 304, which extends through the seatbelt engagement feature 124. In some embodiments, the cargo container 100 is shaped to allow the seat 202 in front of the secured cargo container 100 to recline without interference from the cargo container 100.

In the example shown in FIG. 6, the first bottom panel 132 of the upper portion 102 is disposed at an obtuse angle $\ominus$ (e.g., greater than 90-degrees) relative to the first back panel 114. The obtuse angle $\ominus$ may correspond to the obtuse angle defined between the seating surface 310 of the seat 202 and the seatback 306 of the seat 202 when the seatback 306 is in an upright or reclined position. The first bottom panel 132 being angled in this manner provides a wider base of support for the cargo container 100 and helps reduce wear on the seat 202. The obtuse angle $\ominus$ may also be determined based on a distance between seats 202, a relative position of the seatback 306, the seat depth 300, or the like. In some embodiments, the first bottom panel 132 is adjustable to change the obtuse angle $\ominus$ to accommodate different seat arrangements. The first bottom panel 132 may be hinged with a sliding portion of the first and second side panels 108 and 138 or may be swappable with an angled first bottom panel 132 to form the desired angle $\ominus$. The first bottom panel 132 and other components of the cargo container 100 may also include cushions, contours, rounded edges, coatings, and the like to reduce wear, noise, movement, or the like relative to the seat 202, the floor 302, the armrest 214, or other components of the vehicle 200 or a passenger of the vehicle 200. Also shown in FIG. 6, the rolling elements 140 can be retracted to allow the leg portion 104 to engage the floor 302 directly. The leg portion 104 contacts the floor 302 at the second bottom panel 133. In some examples, the second bottom panel 133 may be angled obtusely like that of the first bottom panel 132. The second bottom panel 133 may also include cushions, texture, structures, coatings, and the like to reduce wear, noise, movement, or the like relative to the floor 302.

Figure 7:
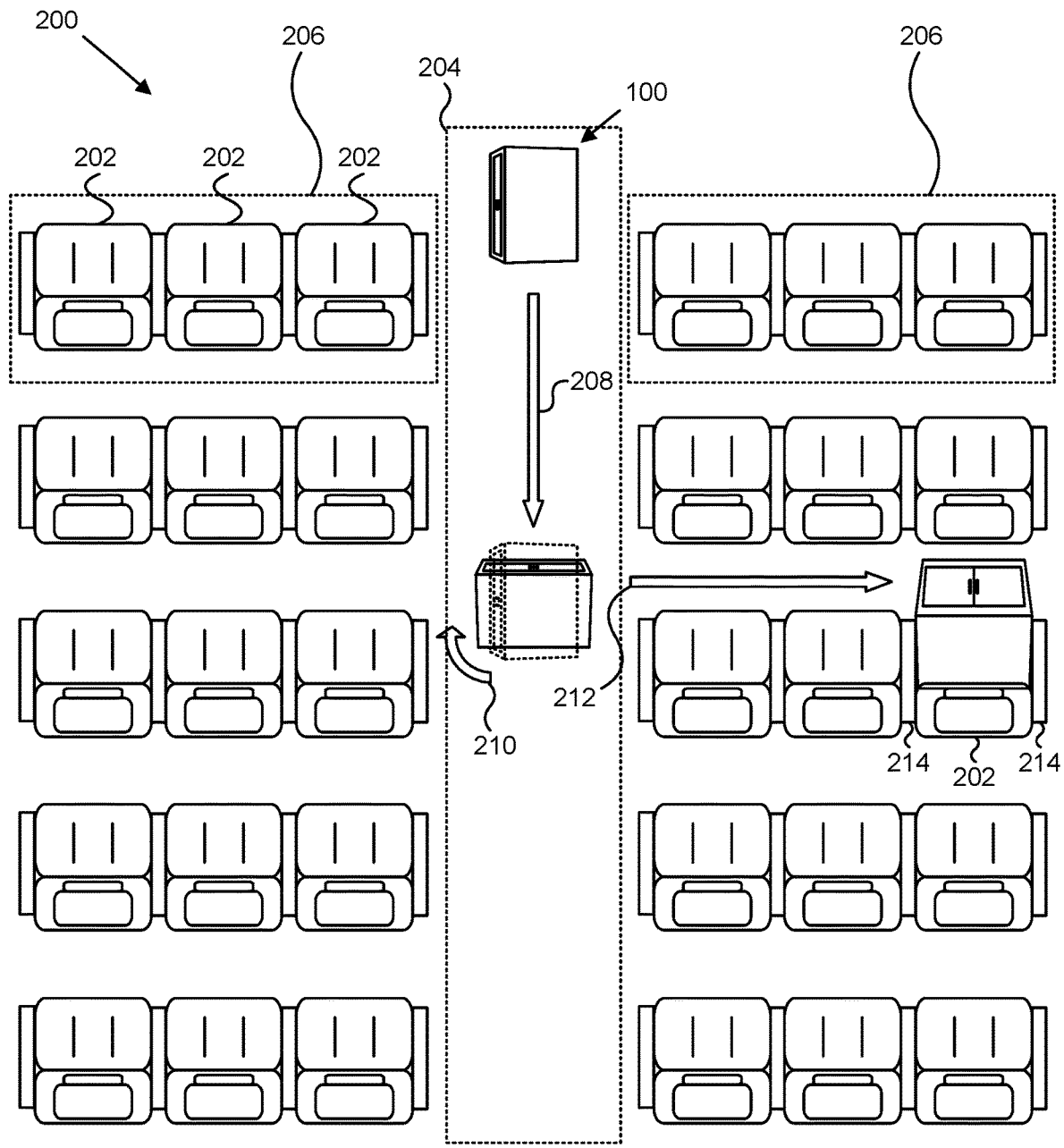
FIG. 7 is an overhead view of a process of placing a cargo container on the vehicle of FIG. 6, according to one or more examples of the present disclosure.

FIG. 7 is an overhead view illustrating a process of placing a cargo container 100 on a seat 202, according to one or more examples of the present disclosure. The illustrated embodiment shows an overhead interior view of the vehicle 200. The vehicle 200 includes a plurality of seats 202 arranged in several rows 206 to form a central passenger aisle 204. As illustrated, the cargo container 100 may be translated along the passenger aisle 204 of the vehicle 200 in a first direction 208. The cargo container 100 is shown as moving sideways down the passenger aisle 204 but may also be moved backwards or forwards down the passenger aisle 204 depending on the size and space afforded by the passenger aisle 204 and the cargo container 100.

Upon reaching a designated row 206 corresponding to a seat 202 of the cargo container 100, the cargo container 100 may be rotated 210 and positioned to align the cargo container 100 such that the leg portion 102 will pass in front of the seats 202 of the row 206 and the upper portion 102 will pass over a seating surface 310 of the seats 202 in the row 206. The cargo container 100 may then be translated, in a second direction 212, along the row 206 to align with a seat 202 designated for the cargo container 100. Once aligned with the seat 202, the cargo container 100 may be secured on the seat 202 with the first bottom panel 132 of the cargo container 100 resting on the seat 202 and a leg portion 104 of the cargo container 100 engaging with the floor 302 of the vehicle 200.

In the illustrated embodiment, the cargo container 100 is sized to fit between one or more armrests 214 of the seat 202. This may provide additional stability and security to the cargo container 100 relative to the seat 202. Additionally, sizing of the cargo container 100 to fit between the armrests 214 of the seat 202 may reduce disruption of the occupant of a seat 202 neighboring the cargo container 100.

Figure 8:
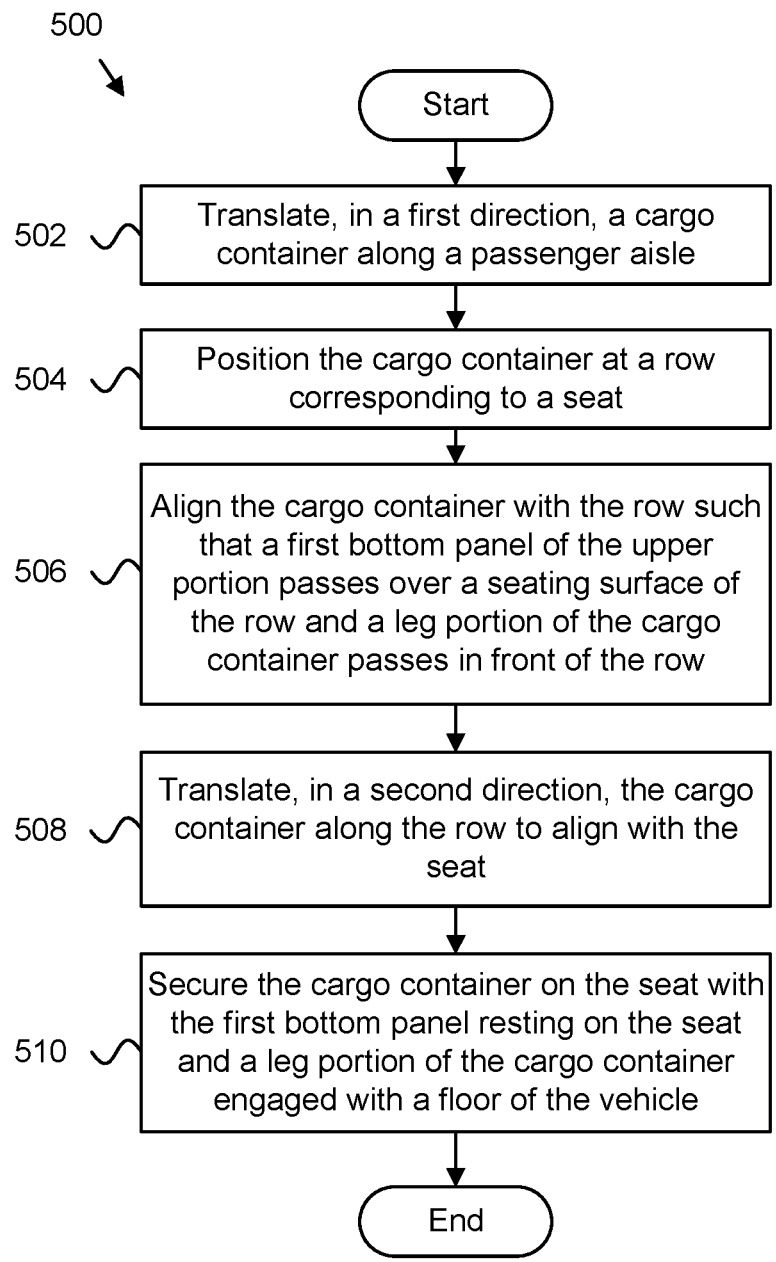
FIG. 8 is a schematic flow diagram of a method of transporting a cargo container, according to one or more examples of the present disclosure.

FIG. 8 is a schematic flow diagram illustrating a method 500 for transporting a cargo container 100. The illustrated method 500 begins and translates 502, in a first direction, a cargo container 100 along a passenger aisle 204. The method 500, in certain embodiments, positions 504 the cargo container 100 at a row 206 corresponding to a seat 202. The method 500, in some embodiments, aligns 506 the cargo container 100 with the row 206 such that a first bottom panel 132 of the upper portion 102 passes over a seating surface 310 of the row 206 and a leg portion 104 of the cargo container 100 passes in front of the row 206. The method 500, in further embodiments, translates 508, in a second direction 212, the cargo container 100 along the row 206 to align with the seat 202. The method 500, in additional embodiments, secures 510 the cargo container 100 on the seat 202 with the first bottom panel 132 resting on the seat 202 and a leg portion 104 of the cargo container 100 engaged with a floor 302 of the vehicle 200.

In some embodiments, translating 502 and 508 the cargo container in the first direction 208 and the second direction 212 includes translating the cargo container 100 on at least one rolling element 140. The at least one rolling element 140 may be capable of rotating 210 the cargo container 100. The at least one rolling element 140 may be extendable and retractable. Securing 510 the cargo container 100 relative to the seat 202 may include engaging a seatbelt 304 of the seat 202 with a seatbelt engagement feature 124 of the cargo container 100.

Figure 9:
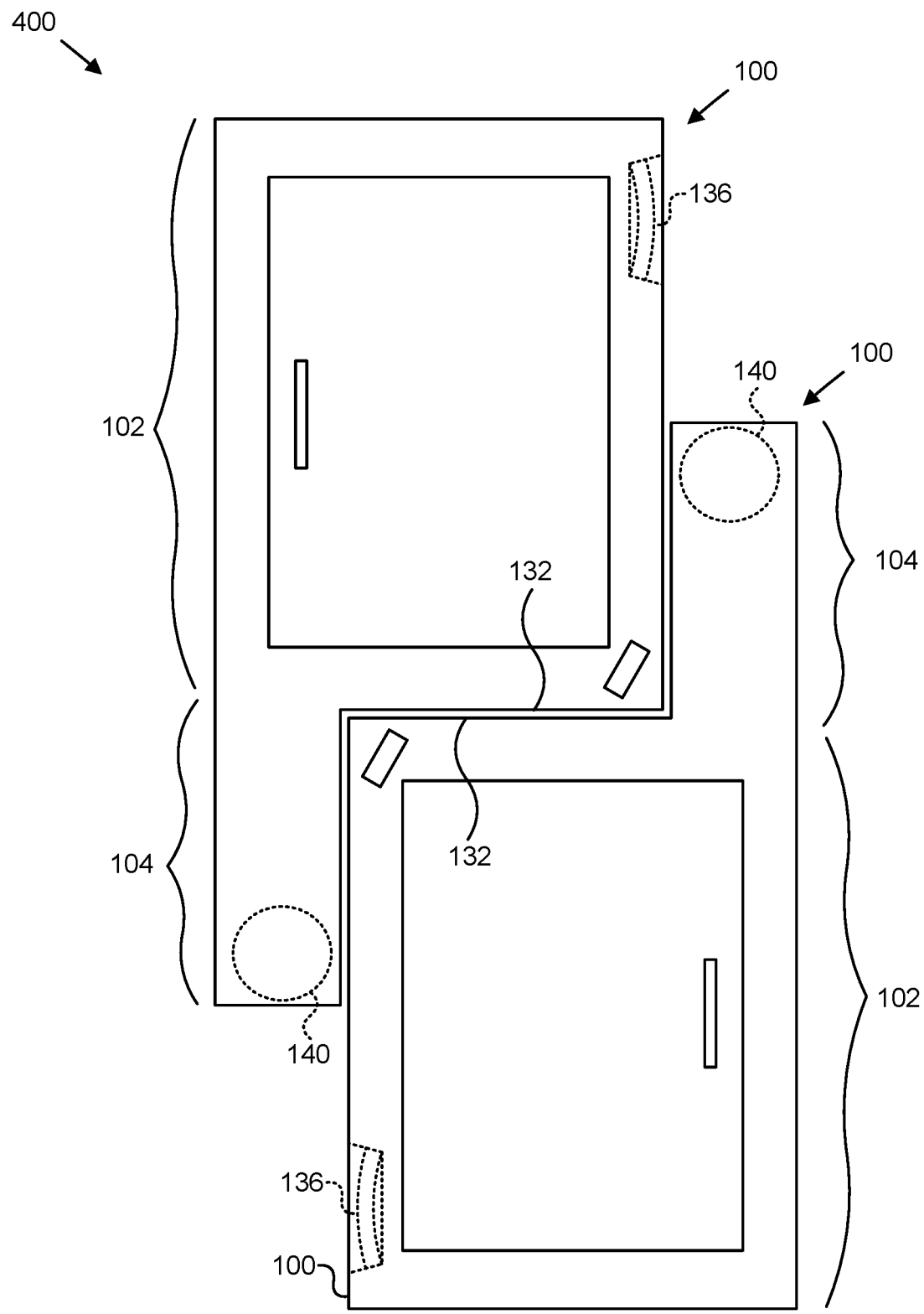
FIG. 9 is a side elevation view of a stacking arrangement of multiple cargo containers of FIG. 1, according to one or more examples of the present disclosure.

FIG. 9 is a side elevation view of a stacking arrangement 400 for multiple cargo containers 100, such as the cargo container 100 shown in FIG. 1. In the illustrated embodiment, one of the cargo containers 100 is inverted and another cargo container 100 is placed on top of the inverted cargo container 100. The cargo containers 100 may be stacked with the first bottom panels 132 of each cargo container 100 in contact with one another. The leg portions 104 of each cargo container 100 are positioned to be alongside the upper portions 102 of the other cargo container 100 to aid in stabilizing the stacking arrangement 400. The cargo containers 100 may include non-recessed or recessed handles 136 and non-retractable or retractable rolling elements 140 as each of the handles 136 and rolling element 140 may not affect the stacking arrangement 400 shown in FIG. 9. The illustrated stacking arrangement 400 benefits from a relatively lower height requirement at the cost of an increased relative width requirement. The arrangement 400 shown in FIG. 9 may be useful for storing the cargo containers 100 in a warehouse, at a kiosk, a boarding terminal, on a tarmac, on a luggage train, in a transport or other vehicle, or the like. In some embodiments, the cargo containers 100 may be available for passenger rental/use or provided to shippers to prepack and deliver to a carrier or vehicle operator for transport.

Figure 10:
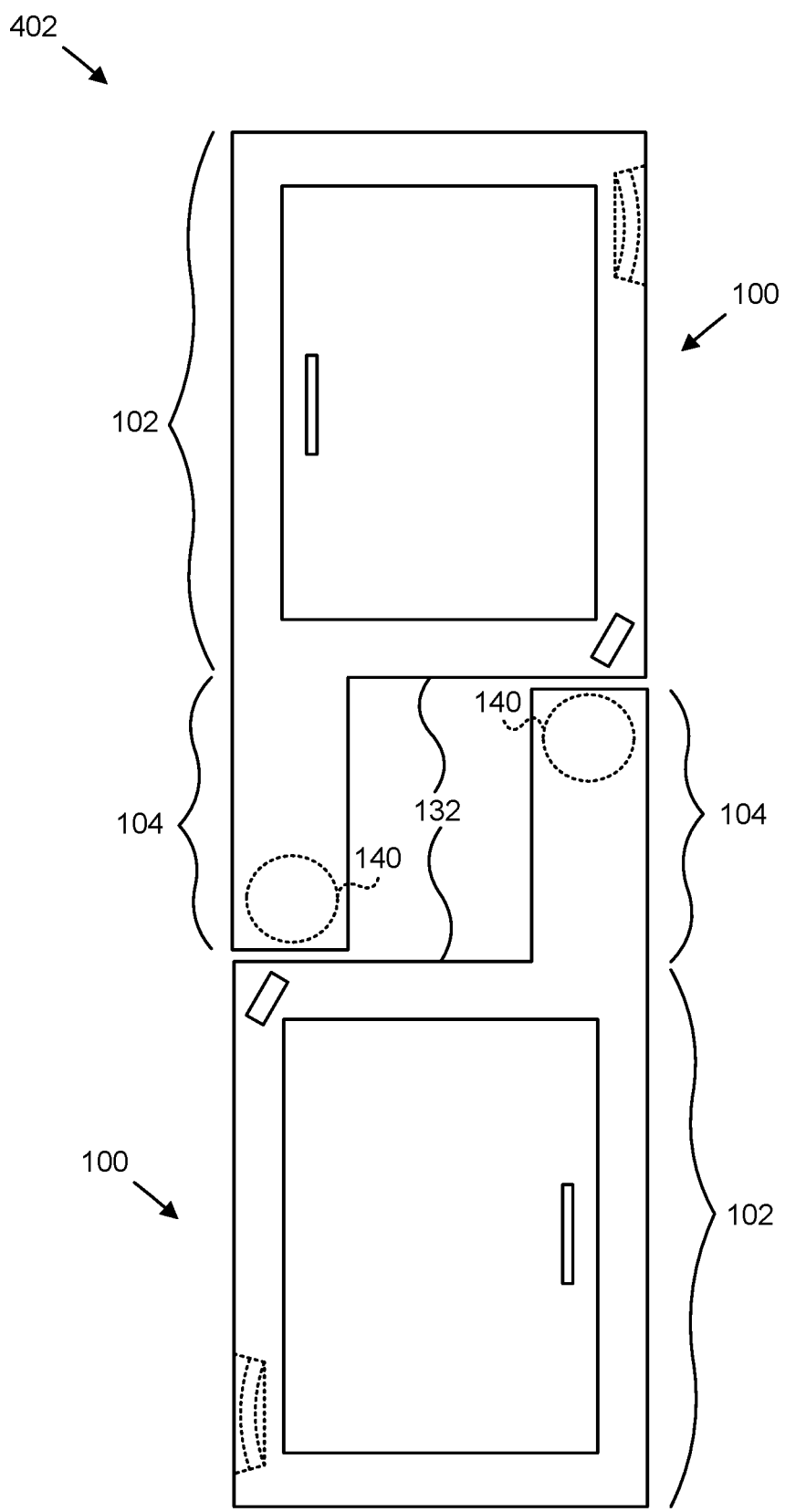
FIG. 10 is a side elevation view of another stacking arrangement of multiple cargo containers of FIG. 1, according to one or more examples of the present disclosure.

FIG. 10 is a side elevation view of another stacking arrangement 402 for multiple cargo containers 100 of FIG. 1. In the illustrated embodiment, the cargo containers 100 are stacked with the leg portions 104 of the each of the cargo containers 100 on the first bottom panels 132 of the other of the cargo containers 100. This stacking arrangement 402 benefits from a retractable embodiment of the rolling elements 140 to provide stability. The illustrated stacking arrangement 402 benefits from a relatively lower width requirement at the cost of an increased relative height requirement. In some instances, the arrangement 402 shown in FIG. 10 may be useful for vertical stacking of the cargo containers 100 in a warehouse or other vertically less-restrictive space or when uniform stacking is advantageous. The arrangement 400 shown in FIG. 9 may be useful to eliminate the unoccupied space between the cargo containers 100 and vertically stack or horizontally layout the cargo containers 100 on the first and second side panels 108 and 138 or other sides or surfaces of the cargo containers 100 in a tessellated manner to avoid the unoccupied space and more efficiently use the storage available for the cargo containers 100.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A cargo container for resting on a seat of a vehicle, the cargo container comprising:
    an upper portion defining a first internal storage space and comprising a top panel, a first bottom panel configured to rest on the seat of the vehicle, a first side panel extending uprightly from the first bottom panel to the top panel, a first back panel extending uprightly from the first bottom panel to the top panel and transversely from the first side panel, and a front panel that is opposite the first back panel, wherein the upper portion has a first depth corresponding with a depth of the seat and further comprises at least one door, formed in the first side panel and openable, about a hinge axis that is parallel to the first back panel, to provide access to the first internal storage space and closable to restrict access to the first internal storage space, and wherein:
        the first bottom panel is disposed at an obtuse angle relative to the first back panel and the hinge axis;
        an entirety of the top panel extends from the first back panel to the front panel at an angle relative to the first bottom panel and perpendicularly relative to the first back panel; and
        the top panel is fixed to the first back panel, the first side panel, and the front panel such that the entirety of the top panel is non-movable relative to the first back panel, the first side panel, and the front panel;
    a leg portion extending from the upper portion, wherein the leg portion has a second depth less than the first depth of the upper portion and the leg portion is sized to engage a floor of the vehicle when the first bottom panel is resting on the seat of the vehicle; and
    a seatbelt engagement feature coupled to the upper portion and configured to engage a seatbelt for the seat of the vehicle.

2. The cargo container of claim 1, wherein the upper portion further comprises at least one door formed in at least one of a front panel and a second side panel of the upper portion, wherein the first side panel and the second side panel are opposite one another.

3. The cargo container of claim 2, wherein:
    the leg portion comprises a front panel;
        the at least one door is formed in the front panel of the upper portion; and
    a portion of the at least one door formed in the front panel of the upper portion forms at least a part of the front panel of the leg portion.

4. The cargo container of claim 1, wherein the leg portion comprises at least one rolling element that is at least partially retractable into the leg portion.

5. The cargo container of claim 4, wherein the at least one rolling element allows for movement of the cargo container in a plurality of directions.

6. The cargo container of claim 1, wherein the leg portion defines a second internal storage space.

7. The cargo container of claim 6, wherein the at least one door formed in the first side panel, when opened, also provides access to the second internal storage space.

8. The cargo container of claim 1, wherein the seatbelt engagement feature forms a passthrough to allow the seatbelt to pass, and be secured, through the cargo container to restrain the cargo container relative to the seat.

9. The cargo container of claim 1, wherein the seatbelt engagement feature comprises at least one coupling to engage with the seatbelt to secure the cargo container relative to the seat.

10. The cargo container of claim 1, further comprising at least one organizational structure disposed within the cargo container to facilitate organization of cargo within the cargo container.

11. The cargo container of claim 10, wherein the organizational structure at least one of subdivides the first internal storage space, isolates the first internal storage space from a second internal storage space defined by the leg portion, and subdivides the second internal storage space.

12. The cargo container of claim 1, further comprising a port disposed in at least one of the upper portion and the leg portion.

13. A system, comprising:
a vehicle comprising at least two seats in tandem, such that a space is defined between the at least two seats, and a floor on which the two seats are supported, wherein each seat comprises a seat back, a seating surface, and a seat belt, and wherein the seat back comprises a headrest;
a cargo container comprising:
an upper portion defining a first internal storage space and comprising a first bottom panel configured to rest on the seat surface of the vehicle and a first top panel opposite the first bottom panel, wherein the upper portion has a first depth, corresponding with a depth of the seat, and a first height extending from the first bottom panel to a portion of the first top panel nearest the first bottom panel, and wherein, when the first bottom panel is resting on the seat surface of the vehicle, the upper portion extends from the seating surface up to at least an upper extent of the headrest, wherein the upper portion further comprises a first side panel extending uprightly from the first bottom panel to the top panel, a first back panel extending uprightly from the first bottom panel to the first top panel and transversely from the first side panel, a front panel that is opposite the first back panel, and at least one door, formed in the first side panel and openable, about a hinge axis that is parallel to the first back panel, to provide access to the first internal storage space and closable to restrict access to the first internal storage space, and wherein:
the first bottom panel is disposed at an obtuse angle relative to the first back panel and the hinge axis;
an entirety of the top panel extends from the first back panel to the front panel at an angle relative to the first bottom panel and perpendicularly relative to the first back panel; and
the top panel is fixed to the first back panel, the first side panel, and the front panel such that the entirety of the top panel is non-movable relative to the first back panel, the first side panel, and the front panel;
a leg portion extending from the upper portion, wherein the leg portion has a second depth less than the first depth of the upper portion, the leg portion has a second height extending from the first bottom panel of the upper portion to a portion of the leg portion furthest away from the first bottom panel, and the leg portion is sized to engage the floor of the vehicle when the first bottom panel is resting on the seating surface of the vehicle, the leg portion further comprising a rolling element at a second bottom panel, and wherein the first height of the upper portion is greater than the second height of the leg portion; and
a seatbelt engagement feature coupled to the upper portion and configured to engage the seatbelt of the seat of the vehicle.

14. The system of claim 13, wherein the cargo container further comprises a hinged door forming at least a portion of the front panel of at least one of the upper portion and the leg portion, wherein the at least one hinged door is openable to provide access to the first internal storage space and closable to restrict access to the first internal storage space.

15. The system of claim 13, wherein
the top panel is perpendicular to the first back panel and the hinge axis and non-parallel relative to the first bottom panel.

16. The system of claim 13, wherein the first height of the upper portion is at least two times the second height of the leg portion.

17. The system of claim 13, wherein the first height of the upper portion is such that the upper portion is at least as high as the seat back of the seat when the first bottom panel of the upper portion is resting on the seat.

18. The system of claim 13, wherein:
the leg portion comprises a second front panel;
at least one door is formed in the front panel of the upper portion; and
a portion of the at least one door formed in the front panel of the upper portion forms at least a part of the second front panel of the leg portion.

19. The system of claim 13, wherein the leg portion comprises at least one rolling element that is at least partially retractable into the leg portion.

20. The system of claim 13, further comprising a port disposed in at least one of the upper portion and the leg portion.

* * * * *